No. 883,691. PATENTED APR. 7, 1908.
R. H. BOWMAN.
NUT LOCK.
APPLICATION FILED OCT. 15, 1907.
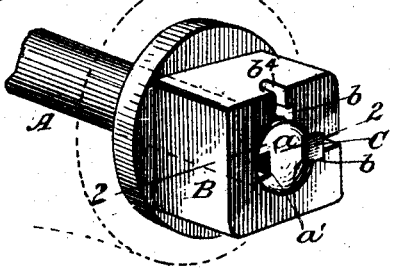
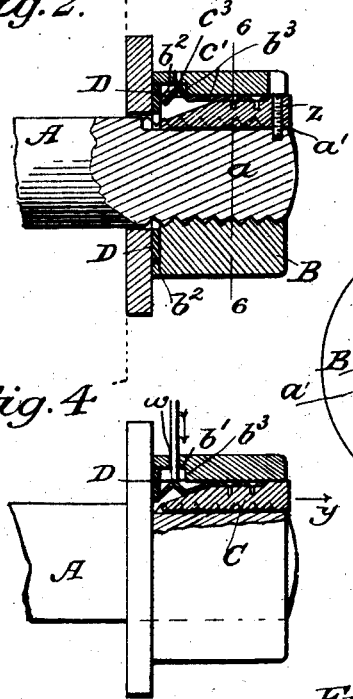
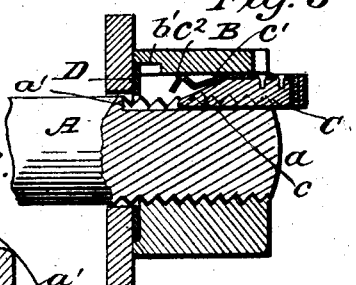
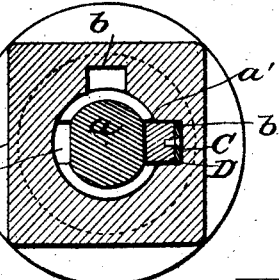
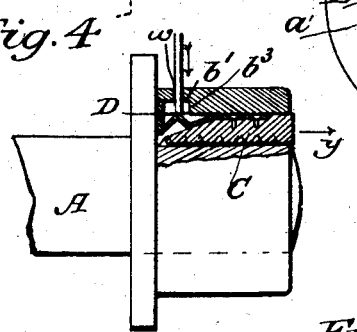
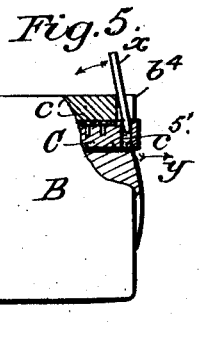
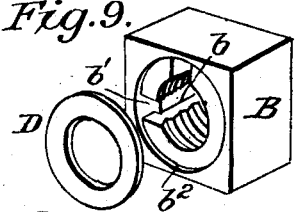
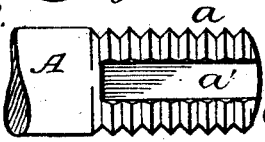
WITNESSES:
Charles H. Wagner
Hayward Woodard
INVENTOR
Robert H. Bowman
BY
Fred G. Dieterich
ATTORNEYS
THE NORRIS PETERS CO., WASHINGTON, D. C.

UNITED STATES PATENT OFFICE.

ROBERT H. BOWMAN, OF CANON CITY, COLORADO.

NUT-LOCK.

No. 883,691.     Specification of Letters Patent.     Patented April 7, 1908.

Application filed October 15, 1907. Serial No. 397,512.

*To all whom it may concern:*

Be it known that I, ROBERT H. BOWMAN, residing at Canon City, in the county of Fremont and State of Colorado, have invented a new and Improved Nut-Lock, of which the following is a specification.

My invention seeks to provide an improved nut lock, of that type more especially adapted for use on vehicle wheel axles, of a simple and inexpensive construction, which can be readily applied for positively holding the axle nut in proper place and which can be quickly adjusted to admit of the removal of the nut when necessary.

With the above and other objects in view, which will hereinafter appear, my invention consists of certain details of construction and novel combinations of parts, all of which will be fully described, specifically pointed out in the appended claims and illustrated in the accompanying drawing, of which:—

Figure 1, is a perspective view of my improved nut lock as applied for use. Fig. 2, is a longitudinal section of the axle, the nut and the locking devices, taken substantially on the line 2—2 on Fig. 1. Fig. 3, is a similar view showing the locking device or detent as partly pushed back to effect the locking of the nut with the bolt or axle. Fig. 4, is a similar view which illustrates one way of releasing the detent to permit of unscrewing the nut. Fig. 5, is a view that illustrates another way of releasing the detent or locking device. Fig. 6, is a transverse section taken on the line 6—6 on Fig. 2. Fig. 7, is a detail view of the locking device or detent. Fig. 8, is a detail view of the threaded end of the axle. Fig. 9, is a perspective view of the rear face of the nut, and the removable washer hereinafter referred to.

In the practical construction of my invention, the threaded end $a$ of the axle or bolt A has two diametrically disposed longitudinal seats $a'$—$a'$ that extend backward a suitable distance to provide for the desired adjustments or home screwing of the nut.

The nut B, which may be of the conventional square or hexagonal external shape is also key seated at two places, it having a pair of longitudinal seats $b\ b$ in its internal threaded face which have the same width and depth as the key seats $a'a'$ in the axle or bolt. The seats $b\ b$ are, however, spaced but one quarter of the distance of the circle of the nut, or in other words, they are arranged on the quarter instead of on the half circle, as are the seats in the axle, so that the nut, at each quarter turn on the axle or bolt, will be in position to be locked on the said axle or bolt by the detent or lock devices presently referred to. The seats $b\ b$ have a depth equal, or slightly greater than the depth of the threads in the axle and at their rear end, for a short space, they have a depth about twice that of the seats in the axle whereby to form radial recesses $b'\ b'$, which merge with a shallow annular recess $b^2$ in the rear face of the nut, the purpose of which will also presently be explained.

So far as described, it will be readily apparent that in fitting the nut on the axle, the said nut will, at each quarter revolution, be in position to be locked with the axle, since either of its seats will be in alinement with one of the diametrically oppositely disposed key seats in the axle, so that the key or detent, by which the nut is locked to the axle, can be readily inserted.

The key or detent C consists of an elongated member adapted to be readily shoved into the space formed by the registering nut and axle seats and it is of a length approximately the thickness of the nut.

The rear upper end of the member C is tapered as at $c$ to give clearance for the locking end of a spring latch $c'$ secured on the upper face of the member C, and having its free end bent up to form a locking lug $c^2$ having a slightly beveled locking shoulder $c^3$ for engaging with the locking shoulders $b^3$ of the nut as clearly shown in Fig. 2, the object of making the latch shoulder $c^3$ slightly beveled being to admit pushing the key or detent C outward under force in the manner clearly understood by reference to Figs. 4 and 5 from which it will be seen that at the front face and in radial alinement with the seats $b\ b$, the nut has recesses $b^4\ b^4$ to permit of inserting a pointed implement $x$ into an aperture $c^5$ in the outer end of the key C, which can be used as a lever for applying force on the member C in the direction of the arrow $y$ sufficient to cause its latch to slip past the shoulders $b^3$. The aperture $c^5$ is preferably threaded as shown to receive a screw plug $z$ if desired, see Fig. 2, for aiding in positively holding the member C to its operative position.

Instead of providing the member C with an aperture $c^5$ and forming the nut with the radial recesses, the rear edge of the nut may have apertures $w$ that communicate with the radial recesses $b'\ b'$ to permit of inserting the wire or similar device as shown in Fig. 4, for depressing the latch end of the lock to allow for threading off the nut.

D designates a washer that seats in the annular recess in the rear face of the nut and which has for its purpose to keep the axle lubricant, oil or grease, from leaking out through the slots or key seats, it also serving as a stop for keeping the member C from going back beyond its proper place.

From the foregoing taken in connection with the accompanying drawing, the complete construction and the manner of use of my improvement will be readily understood.

Since the nut can be locked at each quarter turn it follows that a proper adjustment thereof can be readily provided for by simply shoving the key or detent C, into the registering nut and axle seats, the same automatically assumes its locking position, from which when required it can be easily moved in the manner hereinbefore explained.

Having thus described my invention, what I claim and desire to secure by Letters Patent is:—

1. The combination with the axle and the nut, each having longitudinal key seats adapted to be brought into alinement, the nut having radial recesses at the ends of its key seats and an annular recess on its inner face; of a locking detent adapted to be slid into the alining axle and nut key seats, said detent including a spring latch having a locking lug adapted to extend up into the radial recess at the ends of the nut key seats and a washer that seats in the annular recess on the nut for the purposes stated.

2. The combination of the axle and the nut, each having longitudinal key seats adapted to be brought into alinement, the nut having radial recesses at the inner ends of the seats and radial notches on its front face extending from the said seats, the nut having apertures that extend down to the radial recess; with the locking detent C having the inner end of its upper face downwardly beveled, a spring latch secured to its upper face having an upturned locking lug projected over the said beveled end, said lug having a beveled shoulder, and the detent having an aperture at its outer end, all being arranged substantially as shown and described.

ROBERT H. BOWMAN.

Witnesses:
　H. R. INQUOM,
　THOS. H. LOGAN.